2,686,391
Sheets-Sheet 1
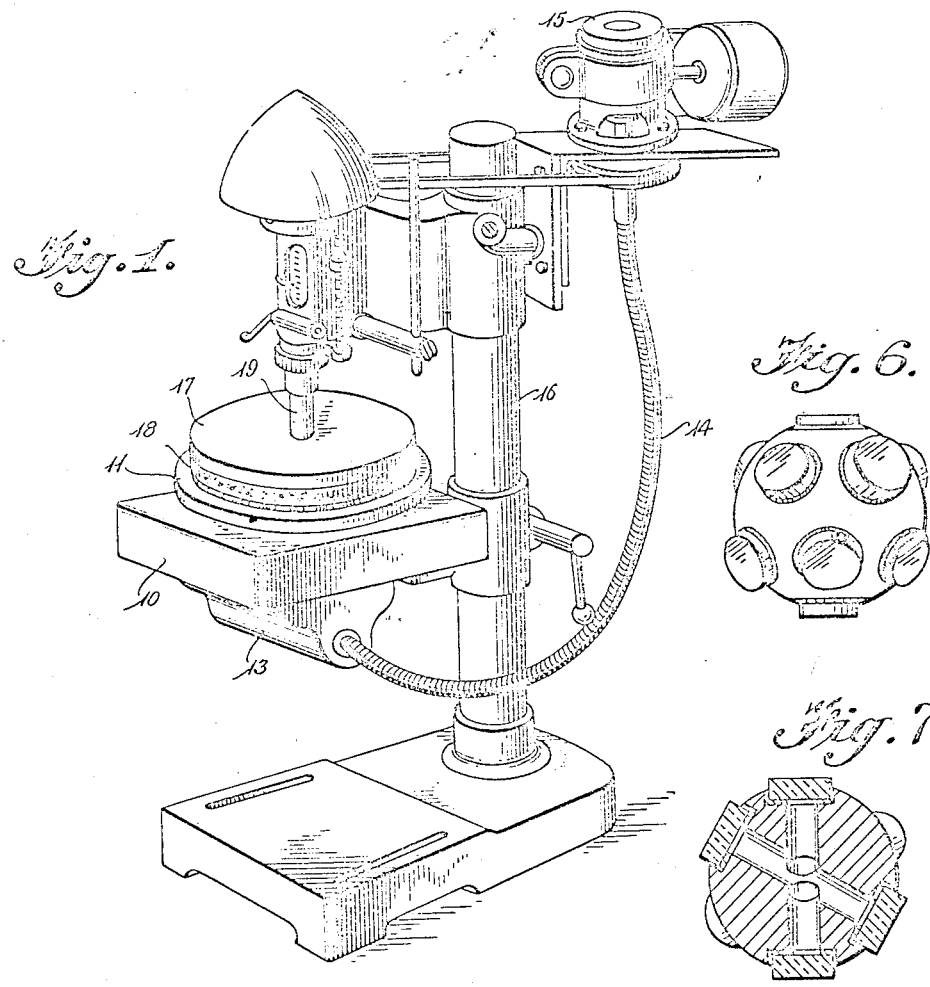
Fig. 1.
Fig. 6.
Fig. 7.
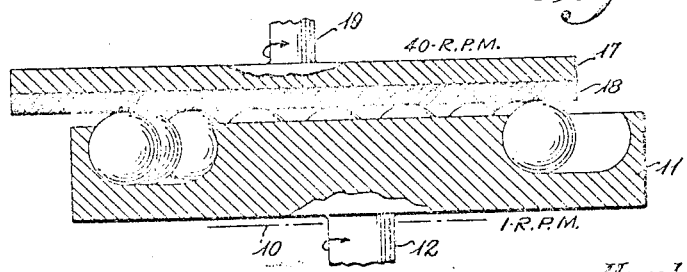
Fig. 2.
INVENTORS
Harold M. Porter and
Patrick H. Reardon
BY Melvin W. Sandmeyer
Their ATTORNEY Aug. 17, 1954  H. M. PORTER ET AL  2,686,391
LENS GRINDING APPARATUS
Filed June 11, 1951  2 Sheets-Sheet 2
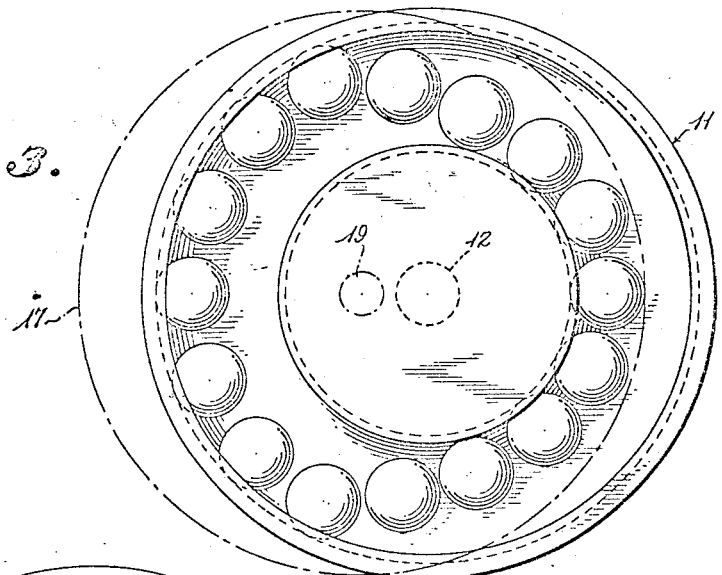
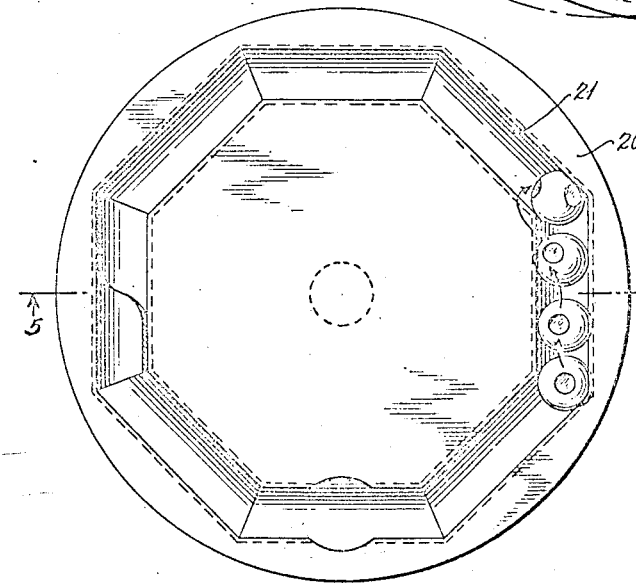
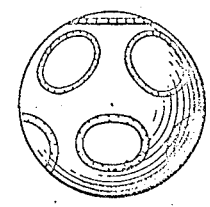
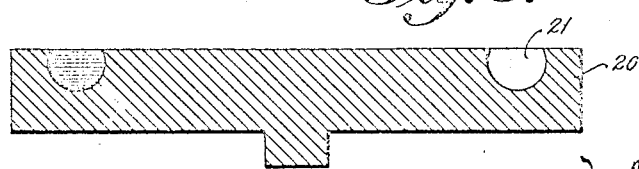
INVENTORS
Harold M. Porter and
Patrick H. Reardon
BY
Their ATTORNEY

UNITED STATES PATENT OFFICE 2,686,391

LENS GRINDING APPARATUS

Harold M. Porter and Patrick H. Reardon, Hagerstown, Md., assignors, by mesne assignments, to The Mitchel-Tyler Company, Hagerstown, Md., a corporation of Maryland Application June 11, 1951, Serial No. 230,883

7 Claims. (Cl. 51—131)

This invention relates to methods and apparatus for the manufacture of lenses and more particularly to the commercial scale manufacture of lenses for microscopes and like instruments.

In the manufacture of plano-convex lenses it is known to mount short cylindrical lens blanks in curved blocks or holders and to move those blocks or holders with respect to a grinding surface whereby to grind the lens blanks to the contour of the mount so as to form thereon the convex surface.

Heretofore, enormous difficulty has been encountered in distributing the wear of the grinding compounds over the surface of the lens holder in such a way that the various lens blanks are ground to an equal extent and the curvature of the lens holder is maintained against distortion.

An example of prior art construction along these lines is to be found in Adams Patent No. 1,706,723, in which a plurality of lens blanks in a spherical mount are simultaneously ground by action of a pair of sockets containing a grinding compound and moving in such a way as to bring about a grinding action. Experience has shown that this arrangement, while capable of producing good results, has the disadvantage that adjustments are extremely critical and it is difficult to maintain the spherical nature of the lens mount or blocker over long periods of use. Prior art, as exemplified by the Adams patent, is capable of producing at a single run only as many lenses as can be mounted in a single sphere, further production requirements making necessary the use of another unit or units.

It is an object of the present invention to overcome the difficulties of the prior art and to provide a method and apparatus for the simultaneous grinding of a large number of blanks under conditions resulting in high quality lenses of marked uniformity.

It is proposed according to the present invention to provide a plurality of spherical blockers each containing a large number of lens blanks and to grind all of the lenses in all of the blockers at one time by causing the spherical blockers to move in a path resulting in a constant change of the axis of rotation of the blockers which results in an even distribution of abrasive effect over the various lens mounts.

Subsidiary advantages of the present invention reside in the ease with which the equipment can be built and operated, low cost of maintenance and wide adaptability to the grinding of lenses of differing focal length.

Other objects and advantages of the present invention will be apparent upon consideration of the following detailed description of several embodiments thereof in conjunction with the annexed drawings wherein:

Figure 1 is a perspective view of lens grinding apparatus according to the present invention;

Figure 2 is a view in vertical section through the driving plate and grinding plate of the apparatus of Figure 1 showing the mutual eccentricity of those parts;

Figure 3 is a plan view of the grinding plate of Figures 1 and 2 showing the position of the driving plate in chain lines;

Figure 4 is a view in plan of a modified type of grinding plate susceptible of use in the assembly of Figure 1;

Figure 5 is a view in section of the grinding plate of Figure 4 taken along the line 5—5 of Figure 4; and Figures 6, 7 and 8 are views of the blockers with lenses therein in the various stages of polishing, Figure 6 showing in elevation the unground lenses in a spherical blocker, Figure 7 showing in section the unground lenses in the blocker of Figure 6 and Figure 8 showing in elevation the finally ground and polished lenses as they appear just before removal from the spherical blocker.

If now more specific reference is made to Figures 1, 2 and 3, it will be observed that the mounting and propulsion of the apparatus of the present invention is accomplished by adaptation of an ordinary drill press. On the work table 10 of the drill press there is mounted a cast iron grinding plate or disc 11, the structure and function of which can best be appreciated by reference to Figures 2 and 3. The grinding disc 11 is of a height greater than that of any blocker ball to be accommodated therein and is provided with an annular concentric groove of a width considerably in excess of the diameter of the blockers to be accommodated therein even when those blockers are in the starting position and are filled with lens blanks having the appearance shown in Figure 6. A spindle 12 extends downwardly from the bottom of the grinding plate 11 through the work table 10 of the drill press and into a gear box 13 containing reduction gearing.

The input end of the gear box 13 is connected by a flexible coupling 14 to a motor 15 mounted on a bracket held at the top of the drill press post 16. The relation between the driving speed of the motor 15 and the gear box is such that the output end of the gear box which is connected to the spindle 12 rotates at about 1 R. P. M. when the motor 15 is energized.

Mounted to the driving spindle of the drill press is a driving plate 17 having a lower face 18 of sponge or soft rubber. The lower face 18 rests upon the spherical blockers as they lie in the annular groove of the grinding plate 11 and propels the blockers causing them to move around the groove in a manner to be hereinafter more fully described. The movement of the plate 17 is accomplished through a spindle 19 which is connected to the drill press spindle or is otherwise connected to be driven from the motor 15. The driving relation between the spindle 19 and the motor 15 is such that the spindle 19 moves at about 40 R. P. M. whereas the spindle 12 moves at but 1 R. P. M.

The functions accomplished by the grinding disc 11 in coaction with the plate 17 can best be understood in reference to a specific construction intended for the grinding of plano-convex lenses having an approximate focal length of 13/16 inch. In this case the blocker balls are of a diameter of 13/16 inch and are made of annealed bearing steel or other suitable material. The balls are machined or cast to provide each with twelve symmetrically disposed radial cavities. Each cavity accommodates a single cylindrical lens blank of 5/16 inch diameter and 1/8 inch in length. The lens blanks are cemented in the cavities with a cellulosic cement of the type that is readily soluble in a volatile solvent. An example of such a cement is a cellulose acetate derivative in acetone. When cemented in position the blanks at their edges project upwardly from the ball surface about 1/16 inch.

The cast iron grinding disc which has been used with 13/16 inch diameter blocker balls is of a diameter of 9 inches and the concentric groove is of 7 7/8 inches diameter. The groove is 7/16 inch deep and 1 1/16 inches wide at the widest portion thereof. The sponge rubber pad 18 is glued to the lower surface of the cast iron disc or plate 17. The diameter of the pad 18 and plate 17 is about 9 inches and the plate 17 weighs about twenty-five pounds. In the assembly of Figure 1, the weight of the plate 17 is used to press on the blockers and the spindle return spring of the drill press is removed. The plate 17 and its pad 18 are eccentric by 1/2 inch to the center of the grinding disc 11. Some variation in eccentricity is possible but it should not exceed 1 inch.

In operation the groove in the grinding disc is filled with 26 blockers of the appearance of Figure 6 and the groove is moistened with a water lubricated silicon carbide or aluminum oxide grinding compound of about 35 microns. After about 2 1/2 hours of grinding the blockers are removed and ground for 3 additional hours under like circumstances in the presence of a grinding compound of 13 microns. During this entire operation the grinding disc 11 is turned at 1 R. P. M. and the plate 17 and its pad 18 at 40 R. P. M. Upon completion of the foregoing 5 1/2-hour schedule, the lens blanks are ground to the contours of the blockers and are ready for polishing.

During the grinding operation the spherical contours of the blockers are perfectly maintained due to the eccentricity of the grinding disc 11 and the plate 17 and its pad 18. This eccentricity causes the blocker balls to rotate about continuously changing axes, the balls describing a path which may be best understood by reference to Figure 3. It will be observed that the balls in travelling around the groove in the grinding disc not only move around the groove but twice in each revolution move from side to side across the groove. It will be recalled that the groove at its widest point is 1 1/16 inches wide, whereas the blockers with the lens blanks in them have an initial overall diameter of about 15/16 inch, allowing a lateral play of 1/8 inch. Of course, as the lens blanks are ground away the room for lateral play increases to about 1/4 inch at the end of the grinding operation. The relative speed difference between the grinding disc and the plate does not appear to affect the distribution of the wear over the blocker balls but rather tends to equalize the wear on the grinding disc.

During the coarse grinding operation which is the first 2 1/2 hours of grinding with a grinding compound of 35 microns, it is possible to bring about even distribution of wear on the blockers and hence even grinding not only by the use of the eccentrically-disposed disc and plate 11 and 17, but also by resort to the expedient shown in Figure 4. In Figures 4 and 5 there is shown a grinding disc having an octagonal groove therein which is of a width just about equal to the width of the blocker balls when the unground lenses are first placed in them. The grinding disc of Figures 4 and 5 is designated by reference numeral 20 and the octagonal groove by reference numeral 21. The grinding plate 20 is mounted in use in the same way as the grinding plate 11 and it is used with a driving disc having a sponge rubber pad on it identical to the construction shown in Figure 2 except that the driving plate is concentric to the center of the groove in the grinding disc rather than eccentric as in the case of the relation between the disc 11 and the driving plate 17. Due to the fact that the groove 21 is octagonal, the blockers have a tendency to change the axis of rotation at each corner of the groove. The arrows in Figure 4 demonstrate about what happens and another attempt has been made to show it on the left side of Figure 4 where the heavy line indicates a line normal to the axis of roll.

The construction of Figures 4 and 5 is especially suitable to use during the coarse initial grinding of the lenses although the apparatus of Figures 1, 2 and 3 is suitable for both the coarse and fine grinding operations. The grinding times and grinding compounds mentioned for the first grinding period in the foregoing specific example are equally applicable to the use of the Figures 4 and 5 modification.

While the apparatus of Figures 1 to 3 differs from that of Figures 4 and 5 all three forms are characterized by the presence of a driving disc or plate and guiding means for the blocker balls such that the distance of the guiding means from the axis of rotation of the driving disc or plate is different as measured in different radii. Specifically, when the guiding groove for the balls is circular, it will be observed that the center of the circular groove is offset relative to the axis of the driving plate. When the groove is octagonal as in Figure 4, it is apparent that at the corners of the octagon the radial distance from the axis of the driving disc is greater than it is mid-way between the corners.

What is claimed is:

1. Lens grinding apparatus comprising a driving disc, a plurality of blocker balls each having surface portions contoured to accommodate a plurality of symmetrically arranged lens blanks, means to guide a plurality of said blocker balls in contact with said disc, said guiding means extending for 360°, means to rotate the driving disc, the radial distance of the guiding means from the axis of the driving disc being different as measured in different radii of the guiding means.

2. Lens grinding apparatus comprising a driving disc, a plurality of blocker balls each having surface portions contoured to accommodate a plurality of symmetrically arranged lens blanks, a grinding plate having a circular groove therein of a width in excess of the diameter of said blocker balls to be accommodated therein, means to rotate the driving disc in bearing engagement with balls in said groove, the center of said circular groove and the axis of said driving disc being mutually offset to cause the blocker balls to roll transversely of the groove in their arcuate movement thereabout.

3. Lens grinding apparatus comprising a driving disc, a grinding plate having a groove therein in the form of a regular polygon to guide blocker balls in contact with said disc, means to rotate the driving disc, the center of the polygon and the axis of the driving disc being coincident.

4. Lens grinding apparatus comprising a driving disc having a lower surface of sponge rubber, means mounting said disc for rotation about a vertical axis and for free vertical movement, means to drive said driving disc about a vertical axis, a grinding disc disposed below said driving disc, a plurality of blocker balls each having surface portions contoured to accommodate a plurality of symmetrically arranged lens blanks, a groove in said grinding disc to guide said plurality of blocker balls in contact with the sponge rubber surface of said driving disc, the radial distance of the guiding means from the axis of the driving disc being different as measured in different radii of the guiding means.

5. Apparatus as claimed in claim 4 in which the weight of the driving disc controls the pressure at which the sponge rubber bears against the blocker balls.

6. Lens grinding apparatus comprising a driving disc having a lower surface of sponge rubber, means mounting said disc for free vertical movement along a vertical axis, means to drive said driving disc about said vertical axis, a grinding plate disposed below said driving disc in a horizontal plane, said grinding plate having a circular groove therein to accommodate blocker balls, the center of said circular groove being offset with respect to the axis of rotation of said driving disc.

7. Lens grinding apparatus comprising a driving disc having a lower surface of sponge rubber, means mounting said disc for free vertical movement along a vertical axis, means to drive said driving disc about said vertical axis, a grinding plate disposed below said driving disc, said grinding plate having a circular groove therein to accommodate blocker balls, means mounting said grinding disc for rotation about a vertical axis coincident with the center of the circular groove and offset with respect to the axis of rotation of the driving disc and means to drive the grinding disc at a rate of speed different from that of the driving disc.

References Cited in the file of this patent

UNITED STATES PATENTS

| Number | Name | Date |
|---|---|---|
| 609,218 | White | Aug. 16, 1898 |
| 1,516,749 | Moore et al. | Nov. 25, 1924 |
| 1,588,435 | Adams | June 15, 1926 |
| 1,706,723 | Adams | Mar. 26, 1929 |
| 1,811,219 | Vetter | June 23, 1931 |
| 1,870,328 | Indge | Aug. 9, 1932 |
| 2,075,216 | Mancuso | Mar. 30, 1937 |
| 2,585,287 | Turner et al. | Feb. 12, 1952 |